(12) United States Patent
Uotinen

(10) Patent No.: US 9,377,318 B2
(45) Date of Patent: Jun. 28, 2016

(54) METHOD AND APPARATUS FOR A NAVIGATION CONVEYANCE MODE INVOCATION INPUT

(71) Applicant: Nokia Technologies Oy, Espoo (FI)

(72) Inventor: Veli-Pekka Tapio Uotinen, Tampere (FI)

(73) Assignee: Nokia Technologies Oy, Espoo (FI)

(*) Notice: Subject to any disclaimer, the term of this patent is extended or adjusted under 35 U.S.C. 154(b) by 310 days.

(21) Appl. No.: 13/929,707

(22) Filed: Jun. 27, 2013

(65) Prior Publication Data
US 2015/0007077 A1    Jan. 1, 2015

(51) Int. Cl.
G06F 3/048     (2013.01)
G01C 21/34     (2006.01)
G06F 3/0488    (2013.01)
G01C 21/36     (2006.01)

(52) U.S. Cl.
CPC ........ *G01C 21/3423* (2013.01); *G01C 21/3605* (2013.01); *G01C 21/3664* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 2009/0091540 A1 | 4/2009 | Doan et al. | |
| 2009/0271109 A1* | 10/2009 | Lee | G01C 21/26 701/532 |
| 2010/0031202 A1 | 2/2010 | Morris et al. | |
| 2010/0090964 A1 | 4/2010 | Soo et al. | |
| 2010/0131188 A1 | 5/2010 | Yeh et al. | |
| 2010/0309147 A1* | 12/2010 | Fleizach et al. | 345/173 |
| 2011/0050589 A1* | 3/2011 | Yan et al. | 345/173 |
| 2011/0074695 A1* | 3/2011 | Rapp et al. | 345/173 |
| 2012/0109513 A1 | 5/2012 | Belimpasakis | |
| 2012/0124516 A1 | 5/2012 | Friedman | |
| 2013/0159935 A1* | 6/2013 | Evans et al. | 715/850 |
| 2013/0268193 A1* | 10/2013 | Kritt | G01C 21/343 701/533 |
| 2013/0326407 A1* | 12/2013 | van Os | G01C 21/00 715/810 |
| 2014/0088870 A1* | 3/2014 | Varoglu et al. | 701/533 |
| 2014/0365113 A1* | 12/2014 | McGavran | G01C 21/00 701/425 |

FOREIGN PATENT DOCUMENTS

WO    2012007745 A    1/2012

OTHER PUBLICATIONS

Kinect Bing Maps—The Gestures, http://www.youtube.com/watch?v=Uj3z6bhcSsM, May 10, 2011, 2 pages.

* cited by examiner

*Primary Examiner* — Stephen Alvesteffer
(74) *Attorney, Agent, or Firm* — Harrington & Smith

(57) ABSTRACT

A method comprising receiving an indication of a navigation conveyance mode invocation input, determining a navigation conveyance mode identified by the navigation conveyance mode invocation input, and entering the navigation conveyance mode is disclosed.

18 Claims, 8 Drawing Sheets

METHOD AND APPARATUS FOR A NAVIGATION CONVEYANCE MODE INVOCATION INPUT

TECHNICAL FIELD

The present application relates generally to a navigation conveyance mode invocation input.

BACKGROUND

As electronic apparatuses have expanded their capabilities, as well as the number and types of operations they perform, interaction has become increasingly complex and time consuming. For example, apparatus interaction may be prone to errors, confusion, and delay. In some circumstances, a user may miss an opportunity to do something, such as capture an image of an event, due to delays associated with interaction. In other circumstances, a user may avoid utilizing an apparatus capability due to a desire to avoid errors, confusion, or delay. Under such circumstances, it may be desirable for a user to be able to interact with the electronic apparatus in a simple, quick, and intuitive manner.

SUMMARY

Various aspects of examples of the invention are set out in the claims.

One or more embodiments may provide an apparatus, a computer readable medium, a non-transitory computer readable medium, a computer program product, and a method for receiving an indication of a navigation conveyance mode invocation input, determining a navigation conveyance mode identified by the navigation conveyance mode invocation input, and entering the navigation conveyance mode.

One or more embodiments may provide an apparatus, a computer readable medium, a computer program product, and a non-transitory computer readable medium having means for receiving an indication of a navigation conveyance mode invocation input, means for determining a navigation conveyance mode identified by the navigation conveyance mode invocation input, and means for entering the navigation conveyance mode.

In at least one example embodiment, entry of the navigation conveyance mode is based, at least in part, the determination of the navigation conveyance mode.

In at least one example embodiment, entrance to the navigation conveyance mode comprises launching a navigation program that effectuates the navigation conveyance mode.

In at least one example embodiment, the indication of the navigation conveyance mode invocation input is received in at least one of a lock mode, a home screen mode, or a document mode.

In at least one example embodiment, the document mode relates to at least one document.

In at least one example embodiment, the document relates to at least one of an email message, a webpage, a contact record, a text message, an instant message, or a calendar entry.

In at least one example embodiment, the document comprises information indicative of a location, and the navigation conveyance mode relates to the location as at least one of a start location or a destination location.

One or more example embodiments further perform determining that the navigation conveyance mode invocation input indicates selection of information indicative of a location.

In at least one example embodiment, the navigation conveyance mode relates to the location as at least one of a start location or a destination location.

In at least one example embodiment, the information indicative of the location relates to a position on a map.

In at least one example embodiment, the map is provided by a navigation program that effectuates the navigation conveyance mode.

In at least one example embodiment, the indication of selection relates to a position of, at least part of, the navigation conveyance mode invocation input corresponding with a position of the information indicative of the location.

One or more example embodiments further perform operating in a different navigation conveyance mode, wherein the indication of the navigation conveyance mode invocation input is received during operation of the different navigation conveyance mode.

In at least one example embodiment, entrance to the navigation conveyance mode comprises transition from the different navigation conveyance mode to the navigation conveyance mode.

In at least one example embodiment, transition from the different navigation conveyance mode to the navigation conveyance mode comprises termination of the different navigation conveyance mode.

One or more example embodiments further perform determining a destination location of the navigation conveyance mode to correlate to a destination location of the different navigation conveyance mode.

One or more example embodiments further perform receiving an indication of a different navigation conveyance mode invocation input, determining a different navigation conveyance mode identified by the different navigation conveyance mode invocation input, and transitioning from the navigation conveyance mode to the different navigation conveyance mode.

One or more example embodiments further perform determining a destination location of the different navigation conveyance mode to correlate to a destination location of the navigation conveyance mode.

In at least one example embodiment, the navigation conveyance mode relates to at least one of an automobile navigation conveyance mode, a pedestrian navigation conveyance mode, or a bicycle navigation conveyance mode.

In at least one example embodiment, the navigation conveyance mode invocation input relates to a gesture input indicative of the navigation conveyance mode.

In at least one example embodiment, determination of the navigation conveyance mode identified by the navigation conveyance mode invocation input comprises determination that the gesture input is the gesture input indicative of the navigation conveyance mode.

In at least one example embodiment, the indication of the gesture input comprises information indicative of a three dimension representation of the gesture.

In at least one example embodiment, the three dimensional representation of the gesture comprises information indicative of, at least one, surface of an object performing the gesture.

In at least one example embodiment, at least one represented surface is not in contact with the apparatus.

In at least one example embodiment, the navigation conveyance mode relates to a pedestrian navigation conveyance mode, and the gesture relates to a finger walking gesture.

In at least one example embodiment, the finger walking gesture relates at least two fingers performing a walking motion.

In at least one example embodiment, the finger walking gesture relates to a three step finger walking motion.

In at least one example embodiment, the three step finger walking motion relates to an in-place finger walking motion.

In at least one example embodiment, the in-place finger walking motion comprises a finger moving in a direction along a plane, the finger being lifted from the plane, a different finger moving in a direction that corresponds with the direction, the different finger being lifted from the plane, and the finger moving in a direction that corresponds with the direction.

In at least one example embodiment, the finger walking motion relates to a translational three step finger walking motion.

In at least one example embodiment, the translation finger walking motion comprises a fingertip being at a position on a plane, the finger being lifted from the plane, a different finger fingertip being placed at another position in a direction, the different finger being retracted, and the finger moving in a direction that corresponds with the direction.

In at least one example embodiment, the navigation conveyance mode relates to an automobile navigation conveyance mode, and the gesture relates to a finger steering gesture.

In at least one example embodiment, the finger steering gesture relates at least two fingers performing a rotation motion in relation to a plane.

In at least one example embodiment, the rotation relates to rotation of the two fingers around a similar focus.

In at least one example embodiment, the plane relates to a surface of the apparatus.

In at least one example embodiment, the surface of the apparatus relates to a touch display.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
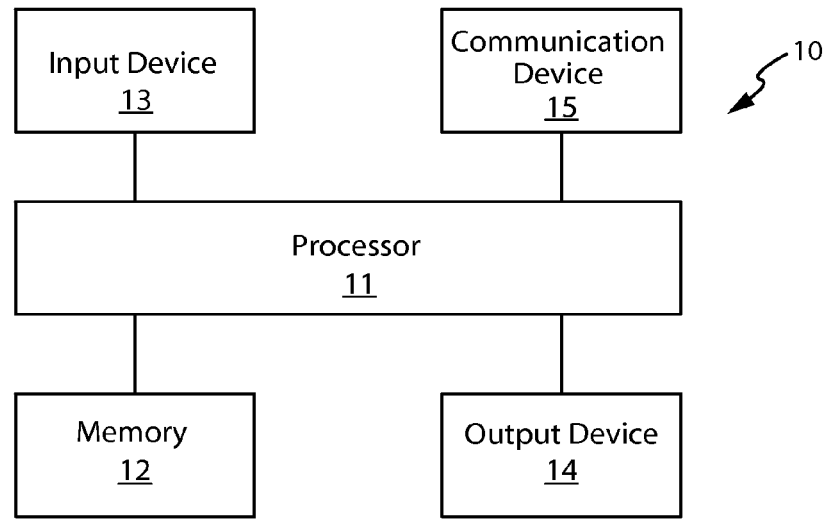
FIG. 1 is a block diagram showing an apparatus according to an example embodiment.

An embodiment of the invention and its potential advantages are understood by referring to FIGS. 1 through 10 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2D are diagrams illustrating a navigation interface according to at least one example embodiment. The examples of FIGS. 2A-2D are merely examples and do not limit the scope of the claims. For example, representation of information may vary, navigation conveyance modes may vary, represented perspective of information may vary, and/or the like.

As users have become more accustomed to the utilizing their electronic apparatuses throughout various aspects of their lives, users have become more reliant on the services provided by their electronic apparatuses. For example, many users frequently utilize their apparatus for navigation, for example by way of a navigation program. For example, the users may monitor their position on a map, may receive directions from a start location to a destination location, and/or the like. In some circumstances, users may be in situations where they may be unable to find a destination location absent the assistance of their apparatus.

As users have become increasingly dependent upon navigation programs, it has become increasingly desirable to simplify the interaction between the user and the navigation program. For example, in some circumstances, it may be desirable to simplify the interaction between the user and the apparatus associated with receiving navigation directions. For example, reducing the amount of user attention related to interaction associated with navigation may provide for improved safety, reduced user error, etc. For example, a user may be interacting with the apparatus while travelling. For example, the user may be interacting with the apparatus while walking, while driving, while cycling, and/or the like. In such circumstances, there may be a direct safety benefit associated with simplification of the interaction associated with navigation.

In at least one example embodiment, a navigation program may provide a plurality of navigation conveyance modes. A navigation program may relate to a program that provides a user with information associated with navigation. For example, the apparatus may provide map information, position information, directions from a start location to a destination location, and/or the like. In at least one example embodiment, a navigation conveyance mode relates to an interaction mode associated with providing directions to a user based on travelling in accordance with a designated form of transportation. For example, a navigation conveyance mode may relate to an automobile navigation conveyance mode, a pedestrian navigation conveyance mode, or a bicycle navigation conveyance mode. In some circumstances, a navigation conveyance mode may differ from another navigation conveyance mode by way of transit time determination, route selection, route utilization, and/or the like. For example, a pedestrian conveyance mode may relate to utilization of sidewalks, while an automobile navigation conveyance mode may relate to preclusion of utilization of sidewalks. In this manner, the navigation conveyance mode may relate to a navigation interaction mode that is tailored towards a specified mode of transportation.

In at least one example embodiment, the navigation program effectuates the navigation conveyance mode. For example, the navigation program may provide instructions that are associated with execution of the navigation conveyance mode. In at least one example embodiment, the apparatus may launch the navigation program. In at least one example embodiment, launch of the navigation program may relate to causing the navigation program to run. For example, if the navigation program has not been initiated by the apparatus, launching may comprise initiating running of the navigation program. In another example, if the navigation program has been initiated, but is currently dormant, launching of the navigation program may relate to causing the navigation program to become non-dormant.

In at least one example embodiment, the navigation program provides for entry into a navigation conveyance mode. For example, the apparatus may enter a navigation conveyance mode by causing the navigation program that effectuates the navigation conveyance mode to operate in the navigation conveyance mode. In at least one example embodiment, operating in the navigation conveyance mode relates to causing the navigation interaction to be in accordance with the navigation conveyance mode.

Figure 2A:
FIGS. 2A-2D are diagrams illustrating a navigation interface according to at least one example embodiment.

FIG. 2A is a diagram illustrating information indicative of a location according to at least one example embodiment. The example of FIG. 2A depicts an interface associated with a user providing information indicative of a start location 202 and information indicative of a destination location 204. The start location and/or the destination location may be based on user input, such as selection of a location from a map, entry of information indicative of the location, selection of information indicative of a location, and/or the like. Information indicative of a location may relate to an address, a set of geographic coordinates, information identifying a point of interest, and/or the like. In at least one example embodiment, the navigation conveyance mode may relate to a location indicated by the information indicative of the location. For example, the navigation conveyance mode may relate to the location as a start location, a destination location, and/or the like.

In at least one example embodiment, the apparatus receives an input indicative of selection of a start location and/or a destination location. For example, the apparatus may receive an indication indicative of a touch input, a tap input, or any other input that may indicate user selection of information indicative of a location. I such an example, the apparatus may determine a start location and/or a destination location based, at least in part, on the input and the information indicative of the location.

In at least one example embodiment, the navigation conveyance mode invocation input may designate a start location and/or a destination location. For example, the navigation conveyance mode invocation input may designate a start location and/or a destination location based, at least in part, on one or more characteristics associated with the input. For example, the apparatus may determine the start location based, at least in part, on a position on the display that correlates with the start of the navigation conveyance mode invocation input. In another example, the apparatus may determine the destination location based, at least in part, on a position on the display that correlates with the end of the navigation conveyance mode invocation input. For example, the apparatus may receive a navigation conveyance mod invocation input similar to the navigation conveyance mode invocation input of FIGS. 4A-4C. In such an example, the apparatus may determine a start location to be a location indicated by the start of the finger walking gesture of FIG. 4A, may determine the destination location to be the end of the finger walking gesture of FIG. 4C, and/or the like.

In another example, the navigation conveyance mode invocation input may comprise a pause during performance of the input. In such an example, the apparatus may determine the pause to be a designation of a start location or a destination location. For example, the apparatus may determine location information indicated by a position of the navigation conveyance mode input during the pause to be a start location and/or a destination location.

In another example, the apparatus may determine a start location and/or a destination location based, at least in part, on receiving the navigation conveyance mode invocation input in relation to a document that comprises information indicative of location. For example, if the user performs the navigation conveyance mode invocation input in conjunction with a message that comprises information indicative of a location, such as an address, the apparatus may determine the start location and/or the destination location based, at least in part, on the information indicative of the location. In such an example, the apparatus may determine the start location and/or the destination location based, at least in part, on the information indicative of the location, even if the navigation conveyance mode invocation input failed to correspond to the information indicative of the location. For example, the apparatus may determine that the navigation conveyance mode invocation input corresponds with the message, and acknowledgement that the message comprises the information indicative of the location. For example, the user may receive an email comprising a business address. In at least one example embodiment, the user may perform a navigation conveyance mode invocation input in relation to the email to cause the apparatus to enter a navigation conveyance mode with the business address as a destination location. In another example, the apparatus may determine the start location and/or the destination location based, at least in part, on a most recently viewed information indicative of a location. For example, in the previous example, if the user closes the email and performs the navigation conveyance mode invocation input, the apparatus may determine the destination location to be the business address based, at least in part, on the business address being recently viewed by way of the apparatus.

In some circumstances, the apparatus may determine a start location and/or a destination location, and provide the user with an interaction that allows the user to change the start location and/or the destination location. For example, after determination of the start location and the destination location, the apparatus may allow the user to transition to the interaction indicated by the example of FIG. 2A. In at least one example embodiment, the apparatus may determine the start location and/or the destination location to correspond with a determined location of the apparatus. For example, the apparatus may determine the location of the apparatus based, at least in part, on geographic location information, such as global positioning system (GPS) information, assisted positioning information, and/or the like.

In the example of FIG. 2A, information indicative of start location 202 relates to "American Airlines Center," which may identify a point of interest. In some circumstances, information indicative of a location may be selected by way of a navigation program or by way of a different program. For example, the user may select information indicative of a location from a document, for example a document provided by a browser program a document viewer, a document editor, and/or the like. In at least one example embodiment, the document relates to an email message, a webpage, a contact record, a text message, an instant message, a calendar entry, and/or the like. For example, the program may identify a portion of the document to be information indicative of a location. In such an example, the program may allow the information indicative of the location to be selected by the user, and may provide the information indicative of the location to the navigation program. The navigation program may receive the information indicative of the location and may utilize the information indicative of the location to be a start location, a destination location, and/or the like.

Figure 2B:
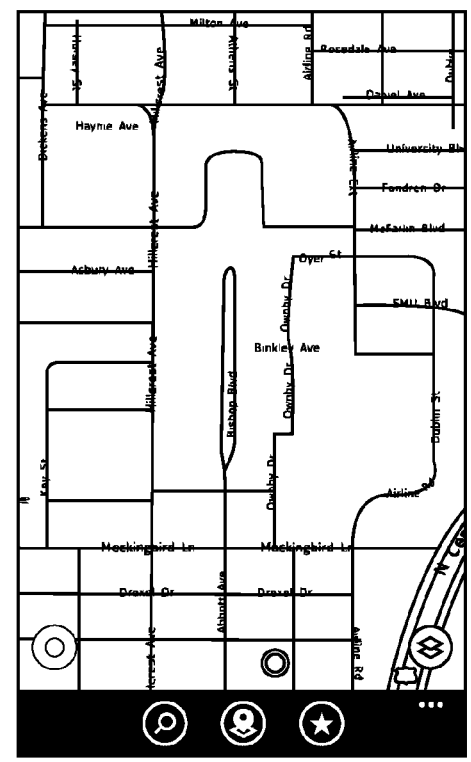

FIG. 2B is a diagram illustrating a navigation map mode according to at least one example embodiment. In at least one example embodiment, selection of information indicative of a location may relate to selection of a position that correlates to a map. For example, the apparatus may determine that an input that correlates to a position on a map. The apparatus may determine that the position on the map is information indicative of a location, and may utilize the information indicative of the location in a navigation conveyance mode. For example, a user may perform an input in relation to the map, such as the map of the example of FIG. 2B. In at least one example embodiment, the map is provided by a navigation program that effectuates the navigation conveyance mode. For example, the map may be provided as part of a map interaction mode, as part of a navigation conveyance mode, and/or the like. In this manner, there may be various interaction modes in which a user may select a position on a map to be utilized by a navigation conveyance mode.

Figure 2C:
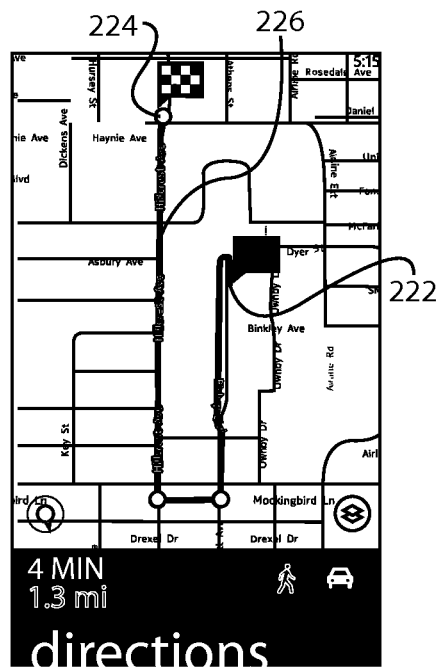

FIG. 2C is a diagram illustrating a navigation conveyance mode according to at least one example embodiment. The example of FIG. 2C relates to an automobile navigation conveyance mode associated with navigation from start location 222 to destination location 224 by way of route 226. It can be seen that the navigation conveyance mode of the example of FIG. 2C relates to an automobile navigation conveyance mode. For example, there is an icon that indicates conveyance by an automobile in the lower right corner of the automobile navigation conveyance mode of FIG. 2C. In addition, it can be seen that the transit time associated with route 226 relates to 4 minutes over a distance of 1.3 miles, which may be consistent with transit time associated with an automobile.

Figure 2D:
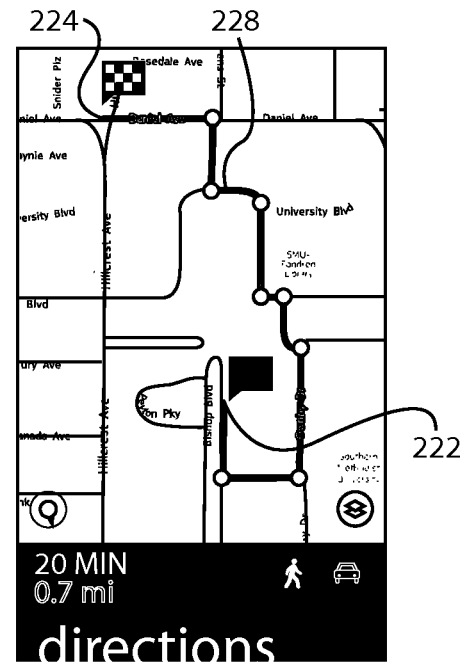

FIG. 2D is a diagram illustrating a navigation conveyance mode according to at least one example embodiment. The example of FIG. 2D relates to a pedestrian navigation conveyance mode associated with navigation from start location 222 to destination location 224 by way of route 228. It can be seen that the navigation conveyance mode of the example of FIG. 2D relates to a pedestrian navigation conveyance mode. For example, there is an icon that indicates conveyance by walking in the lower right corner of the pedestrian navigation conveyance mode of FIG. 2D. In addition, it can be seen that the transit time associated with route 228 relates to 20 minutes over a distance of 0.7 miles, which may be consistent with transit time associated with walking. Furthermore, it can be seen that route 228 of the pedestrian navigation conveyance mode of FIG. 2D differs from route 226 of FIG. 2C, even though both routes are from start location 222 to destination location 224. In this manner, it can be seen that the route associated with a navigation conveyance mode may be different from a route associated with a different navigation conveyance mode.

Figure 3A:
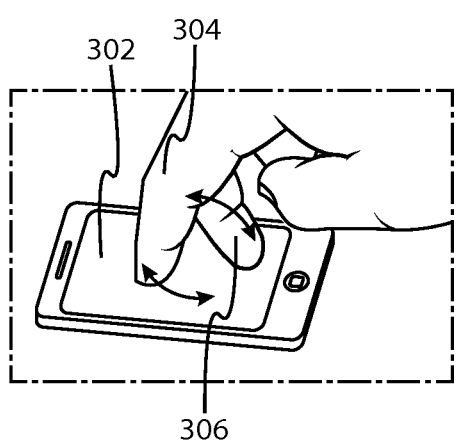
FIGS. 3A-3C are diagrams illustrating a navigation conveyance mode invocation input according to at least one example embodiment.
Figure 3B:
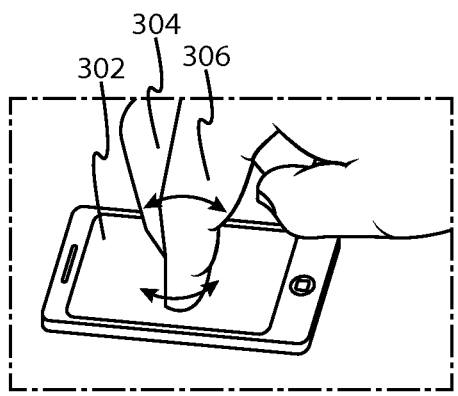
Figure 3C:
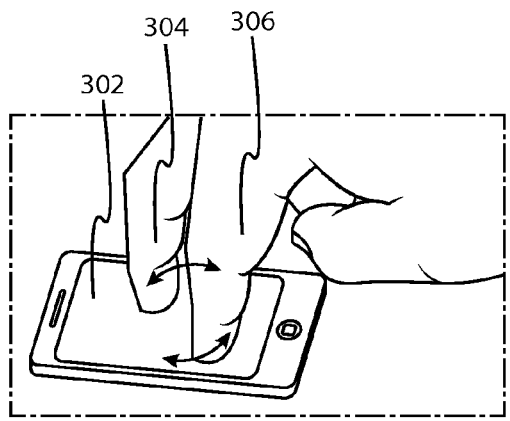

FIGS. 3A-3C are diagrams illustrating a navigation conveyance mode invocation input according to at least one example embodiment. The examples of FIGS. 3A-3C are merely examples and do not limit the scope of the claims. For example, orientation of the apparatus may vary, object performing the input may vary, actions associated with the input may vary, and/or the like.

In at least one example embodiment, the apparatus enters a navigation conveyance mode based, at least in part, on a navigation conveyance mode invocation input. As previously described, in some circumstances, it may be desirable for interaction associated with navigation to be simple. Furthermore, it may be desirable for input associated with entry to a navigation conveyance mode to be simple and intuitive. For example, it may be desirable for the user to be able to identify the input with the mode of transportation associated with the navigation conveyance mode. In this manner, it may be desirable for the navigation conveyance mode invocation input to be indicative of the navigation conveyance mode that is associated with the navigation conveyance mode invocation input.

In at least one example embodiment, a navigation conveyance mode is identified by a navigation conveyance mode invocation input. For example, the navigation conveyance mode invocation input may be associated with a single navigation conveyance mode. In this manner, the navigation conveyance mode invocation input may identify the navigation conveyance mode by way of the singular association between the navigation conveyance mode invocation input and the navigation conveyance mode.

In at least one example embodiment, the apparatus may enter a navigation conveyance mode based, at least in part, on a navigation conveyance mode invocation input that is received in a different interaction mode. For example, the apparatus may receive an indication of the navigation conveyance mode invocation input in a lock mode, a home screen mode, a document mode, a mode of a different program, and/or the like. In such an example, the apparatus may enter the navigation conveyance mode associated with the navigation conveyance mode invocation input from the other interaction mode. In at least one example embodiment, a document mode relates to a mode in which a document is presented to the user, similar as described regarding FIGS. 2A-2D.

In at least one example embodiment, the navigation conveyance mode invocation input relates to a gesture input indicative of the navigation conveyance mode. In at least one example embodiment, a gesture input relates to input that is characterized by one or more aspects related to a motion. For example, the gesture may relate to a specified motion to designate a navigation conveyance mode initiation input. The gesture input may relate to one or more touch inputs that are indicative of the gesture. For example, the apparatus may comprise a touch sensor, and the apparatus may determine that the user has performed the gesture based, at least in part, on information received from the touch sensor.

In at least one example embodiment, the indication of the gesture input comprises information indicative of a three dimension representation of the gesture. For example, the apparatus may be configured to receive information indicative of an object that performs the gesture input, such as a hand. In at least one example embodiment, the apparatus determines information indicative of the object. In at least one example embodiment, the information indicative of the object relates to information indicative of a surface of the object. In at least one example embodiment, the information indicative of the object relates to information indicative of a surface of the object that is not in contact with a touch sensor. For example, the apparatus may utilize a proximity sensor, an imaging sensor, a capacitive sensor, and/or the like to determine information indicative of at least one surface of the object that is not in contact with the apparatus. In this manner, the apparatus may determine a three dimensional representation of the gesture input. In at least one example embodiment, the apparatus determines that a gesture input is indicative of a navigation conveyance mode invocation input. For example, the apparatus may determine that the gesture input corresponds with a navigation conveyance mode invocation input.

In some circumstances, it may be desirable for the user to be able to perform selection of information indicative of a location by way of the navigation conveyance mode invocation input. For example, the apparatus may determine that the navigation conveyance mode invocation input indicates selection of information indicative of a location. In at least one example embodiment, the indication of selection relates to a position of, at least part of, the navigation conveyance mode invocation input corresponding with a position of the information indicative of the location. For example, that start of the navigation conveyance mode invocation input may correspond with the information indicative of the location. In such an example, the start of the navigation conveyance mode invocation input may relate to a contact input indicative of the start of a gesture input, a motion indicative of the start of the gesture input, and/or the like. In another example, that end of the navigation conveyance mode invocation input may correspond with the information indicative of the location. In such an example, the end of the navigation conveyance mode invocation input may relate to a release input indicative of the end of a gesture input, a cessation of motion indicative of the end of the gesture input, and/or the like.

Even though the examples of FIGS. 3A-3C, FIGS. 4A-4C, and FIGS. 5A-5D illustrate examples of navigation conveyance mode invocation inputs, various example embodiments, may differ the navigation conveyance invocation inputs and/ or the associated navigation conveyance mode. For example, there may be a bicycle and/or a motorcycle navigation conveyance mode. For example, such a navigation conveyance mode may determine a route based, at least in part, on criteria that may be important to a syclist, such as view, bicycle or motorcycle safety, and/or the like. In such an example, there may be a cycling navigation conveyance mode invocation input. For example, the cycling navigation conveyance mode invocation input may relate to a gesture that correlates two touch inputs as a tires of a bicycle or motorcycle, and the gesture may comprise concentric tracing of a path by the two touch inputs in a manner consistent with a rear bicycle tire or motorcycle tire following a front bicycle or motorcycle tire. For example the gesture may comprise a swerving motion that utilizes the user's fingers to indicate tires of a bicycle or motorcycle during the swerving motion.

The example of FIGS. 3A-3C relates to an example of an automobile navigation conveyance mode invocation input. In at least one example embodiment, the navigation conveyance mode relates to an automobile navigation conveyance mode, and the gesture relates to a finger steering gesture. In at least one example embodiment, the finger steering gesture is indicative of the fingers, which are performing the finger steering gesture, turning a steering wheel of an automobile. Without limiting the scope of the claims in any way, at least one technical advantage associated with a finger steering gesture being an automobile navigation conveyance mode invocation input may be to associate the automobile navigation conveyance mode invocation input with an activity that is associated with driving an automobile. In this manner, it may be easy for the user to understand the effect of performance of the automobile navigation conveyance mode invocation input, to remember the automobile navigation conveyance mode invocation input, and/or the like.

In at least one example embodiment, the finger steering gesture relates to at least two fingers performing a rotation motion in relation to a plane. In at least one example embodiment, the rotation relates to rotation of the two fingers around a similar focus, such as a center. The plane may relate to a physical plane and/or a metaphorical plane. For example, the plane may relate to a relationship to one or more parts of the automobile navigation conveyance mode invocation input without necessarily corresponding to any surface that comprises a resemblance to a plane. In at least one example embodiment, the plane relates to a surface of the apparatus. For example, the surface of the apparatus may relate to a touch display, a side of an apparatus, a back surface of the apparatus, and/or the like.

The example of FIGS. 3A-3C illustrates fingers 304 and 306 performing a finger steering gesture on apparatus 302. In the example of FIG. 3A, fingers 304 and 306 begin rotating around a focus between fingers 304 and 306. The example of FIG. 3B indicates fingers 304 and 306 at an intermediate position during the rotation. The example of FIG. 3C indicates fingers 304 and 306 at a position where the rotation ceases. In at least one example embodiment, the finger steering gesture relates to performance of the rotation depicted in FIGS. 3A-3C in a direction, followed by a corresponding rotation in an opposite direction. In this manner, the finger steering gesture may be indicative of turning a wheel from an orientation to a different orientation, and returning the wheel from the different orientation to the orientation. In at least one example embodiment, the finger steering gesture relates to one or more iterations indicative of turning a wheel from an orientation to a different orientation, and returning the wheel from the different orientation to the orientation one or more times.

In at least one example embodiment, the finger steering gesture relates to rotation of 150 degrees to 180 degrees. For example, the finger steering gesture may relate to a 90 degree clockwise rotation followed by a 180 degree counter clockwise rotation. In such an example, the 180 degree counterclockwise rotation may relate to rotation of 90 degrees counterclockwise from the start angle of the finger steering gesture. In another example, the finger steering gesture may relate to a 90 degree counterclockwise rotation followed by a 180 degree clockwise rotation. In such an example, the 180 degree clockwise rotation may relate to rotation of 90 degrees clockwise from the start angle of the finger steering gesture. Even though the example of FIGS. 3A-3C illustrates a two-finger steering gesture, the number of fingers associated with the finger steering gesture may vary. For example, there may be a single finger steering gesture, a three finger steering gesture, a four finger steering gesture, and/or the like.

Figure 4A:
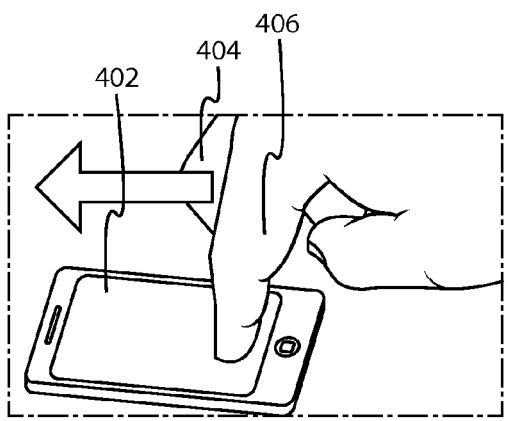
FIGS. 4A-4C are diagrams illustrating a navigation conveyance mode invocation input according to at least one example embodiment.
Figure 4B:
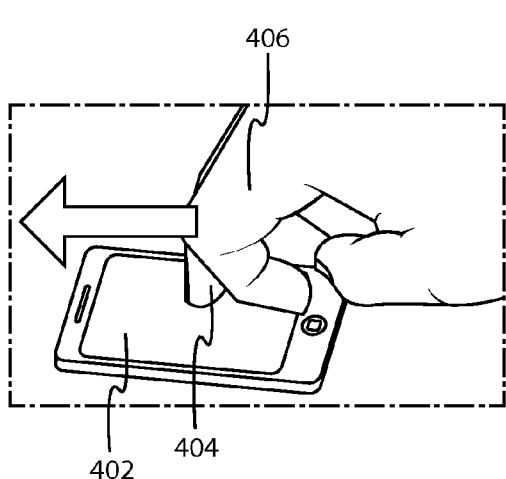
Figure 4C:
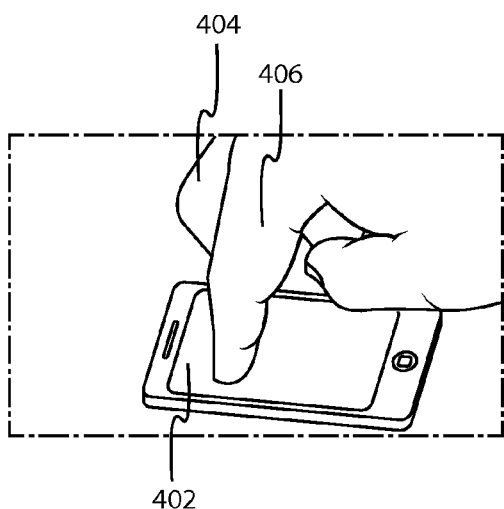

FIGS. 4A-4C are diagrams illustrating a navigation conveyance mode invocation input according to at least one example embodiment. The examples of FIGS. 4A-4C are merely examples and do not limit the scope of the claims. For example, orientation of the apparatus may vary, object performing the input may vary, actions associated with the input may vary, and/or the like.

In at least one example embodiment, the navigation conveyance mode relates to a pedestrian navigation conveyance mode, and the gesture relates to a finger walking gesture. In at least one example embodiment, the finger walking gesture relates at least two fingers performing a walking motion. For example, the finger walking gesture may be indicative of fingers taking steps in mimicry of a person taking steps. In such an example, the fingers that are performing the gesture may be reminiscent of legs performing walking. Without limiting the scope of the claims in any way, at least one technical advantage associated with a finger walking gesture being a pedestrian navigation conveyance mode invocation input may be to associate the pedestrian navigation conveyance mode invocation input with an activity that is indicative of walking. In this manner, it may be easy for the user to understand the effect of performance of the pedestrian navigation conveyance mode invocation input, to remember the pedestrian navigation conveyance mode invocation input, and/or the like.

In some circumstances, the finger walking gesture may be indicative of one or more finger steps. In at least one example embodiment, a finger step relates to a step performed by one finger. For example a finger step may be related to a transition indicated between FIGS. 4A and 4B, between FIGS. 4B and 4C, between FIGS. 5A-5C, and/or the like. In at least one example embodiment, the finger walking gesture relates to a three step finger walking motion. Without limiting the scope of the claims in any way, at least one technical effect associated with the finger walking gesture relating to a three step finger walking gesture may be to provide differentiation from the finger steering gesture, to provide differentiation from another gesture, and/or the like.

In at least one example embodiment, the finger walking motion relates to a translation finger walking motion. In at least one example embodiment, the translational walking motion relates to a walking motion that is indicative of walking from one position to another position. For example, the translation walking motion may relate to translation from one position to another position. In at least one example embodiment, the translation finger walking motion comprises a fingertip being at a position on a plane, the finger being lifted from the plane, a different finger fingertip being placed at another position in a direction, the different finger being retracted, and the finger moving in a direction that corresponds with the direction.

The plane may relate to a physical plane and/or a metaphorical plane. For example, the plane may relate to a relationship to one or more parts of the pedestrian navigation conveyance mode invocation input without necessarily corresponding to any surface that comprises a resemblance to a plane. In at least one example embodiment, the plane relates to a surface of the apparatus. For example, the surface of the apparatus may relate to a touch display, a side of an apparatus, a back surface of the apparatus, and/or the like.

The example of FIGS. 4A-4C illustrates fingers 404 and 406 performing a translational finger walking gesture on apparatus 402. The example of FIG. 4A illustrates fingertip of finger 406 being at a position on a plane, and finger 404 being above the plane and moving in a direction from finger 406. It can be seen that, at some time, between the example of FIG. 4A and the example of FIG. 4B, that finger 406 has been lifted from the plane. The example of FIG. 4B illustrates fingertip of finger 404 being placed at another position in the direction, and finger 406 being above the plane and moving in the direction from finger 404. In this manner, in the example of FIG. 4B, finger 406 has been retracted from the plane. The example of FIG. 4C illustrates fingertip of finger 406 being placed at yet another position in the direction, and finger 404 being above the plane. In this manner, in the example of FIG. 4C, finger 404 has been retracted from the plane. In at least one example embodiment, the translation finger walking motion may continue by repeating the example of FIG. 4A after the example of FIG. 4C.

FIGS. 5A-5D are diagrams illustrating a navigation conveyance mode invocation input according to at least one example embodiment. The examples of FIGS. 5A-5D are merely examples and do not limit the scope of the claims. For example, orientation of the apparatus may vary, object performing the input may vary, actions associated with the input may vary, and/or the like.

In at least one example embodiment, the finger walking motion relates to an in-place finger walking motion. In at least one example embodiment, the in-place finger walking gesture relates to fingers walking without necessarily moving the position of the hand. The in-place finger walking motion may be indicative of walking on a treadmill. In at least one example embodiment, the in-place finger walking motion comprises a finger moving in a direction along a plane, the finger being lifted from the plane, a different finger moving in a direction that corresponds with the direction, the different finger being lifted from the plane, and the finger moving in a direction that corresponds with the direction.

The plane may relate to a physical plane and/or a metaphorical plane. For example, the plane may relate to a relationship to one or more parts of the pedestrian navigation conveyance mode invocation input without necessarily corresponding to any surface that comprises a resemblance to a plane. In at least one example embodiment, the plane relates to a surface of the apparatus. For example, the surface of the apparatus may relate to a touch display, a side of an apparatus, a back surface of the apparatus, and/or the like.

Figure 5A:
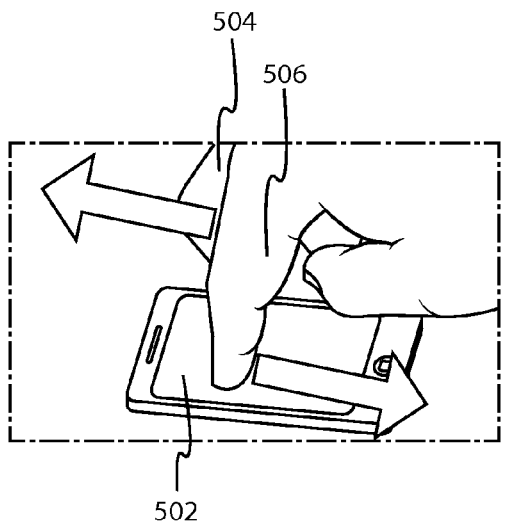
FIGS. 5A-5D are diagrams illustrating a navigation conveyance mode invocation input according to at least one example embodiment.
Figure 5B:
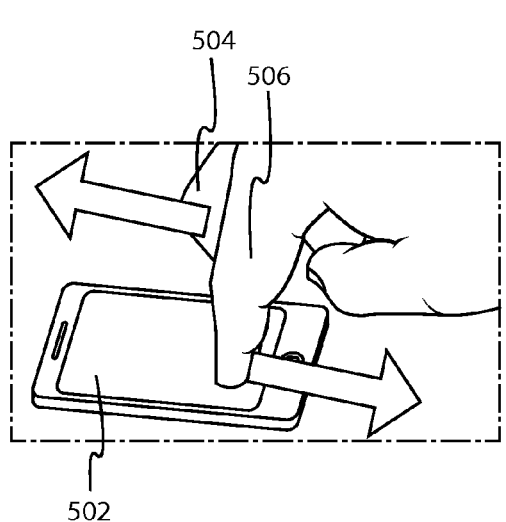
Figure 5C:
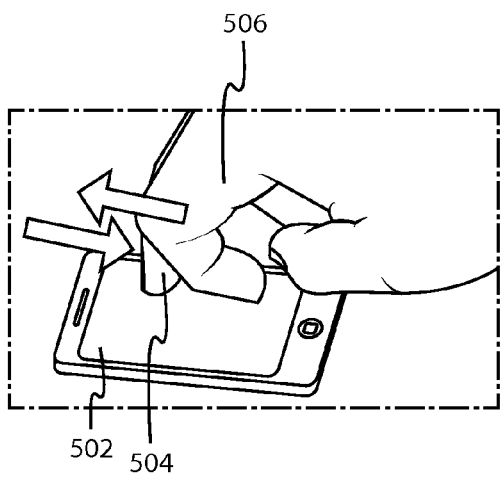
Figure 5D:
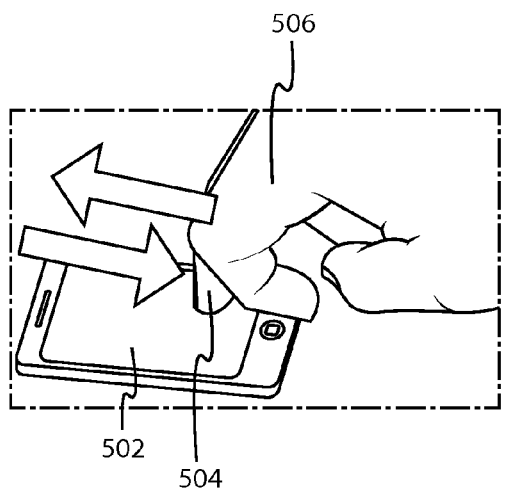

The example of FIGS. 5A-5D illustrates fingers 504 and 506 performing an in-place finger walking gesture on apparatus 502. The example of FIG. 5A illustrates finger 506 moving in a direction along a plane. The example of FIG. 5A also illustrates finger 504 lifted from the plane and moving in an opposite direction. In the example of FIG. 5B, it can be seen that finger 506 has moved further in the direction and that finger 504 has moved further in the opposite direction. The example of FIG. 5C illustrates finger 506 having been lifted and moving in the opposite direction. The example of FIG. 5A also illustrates finger 504 having been placed on the plane and moving in the direction. In the example of FIG. 5D, it can be seen that finger 504 has moved further in the direction and that finger 506 has moved further in the opposite direction. In at least one example embodiment, the in-place finger walking motion may continue by repeating the example of FIG. 5A after the example of FIG. 5D.

Figure 6:
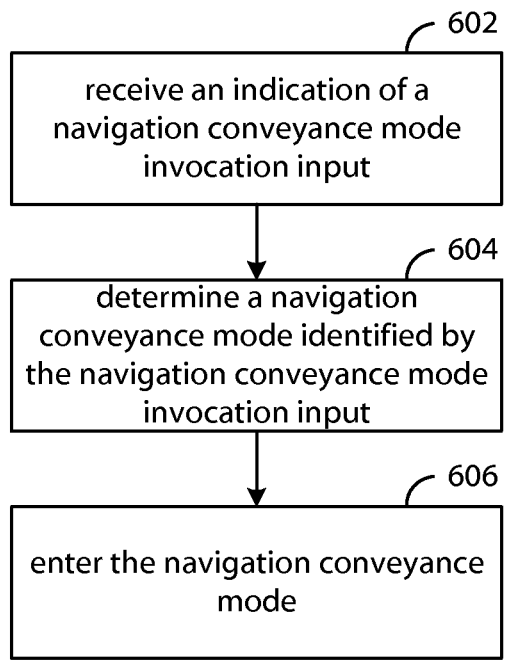
FIG. 6 is a flow diagram illustrating activities associated with a navigation conveyance mode according to at least one example embodiment.

FIG. 6 is a flow diagram illustrating activities associated with a navigation conveyance mode according to at least one example embodiment. In at least one example embodiment, there is a set of operations that corresponds the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus receives an indication of a navigation conveyance mode invocation input. The receipt, the indication, and the navigation mode invocation input may be similar as described regarding FIGS. 2A-2D, FIGS. 3A-3C, FIGS. 4A-4C, FIGS. 5A-5D, and/or the like.

At block 604, the apparatus determines a navigation conveyance mode identified by the navigation conveyance mode invocation input. The determination and the navigation conveyance mode may be similar as described regarding FIGS. 2A-2D, FIGS. 3A-3C, FIGS. 4A-4C, FIGS. 5A-5D, and/or the like.

At block 606, the apparatus enters the navigation conveyance mode. The entry of the navigation conveyance mode may be similar as described regarding FIGS. 2A-2D, FIGS. 3A-3C, and/or the like. In this manner, entry of the navigation conveyance mode may be based, at least in part, on the determination of the navigation conveyance mode. For example, entry of the navigation conveyance mode may be caused, at least in part, by the determination of the navigation conveyance mode.

Figure 7:
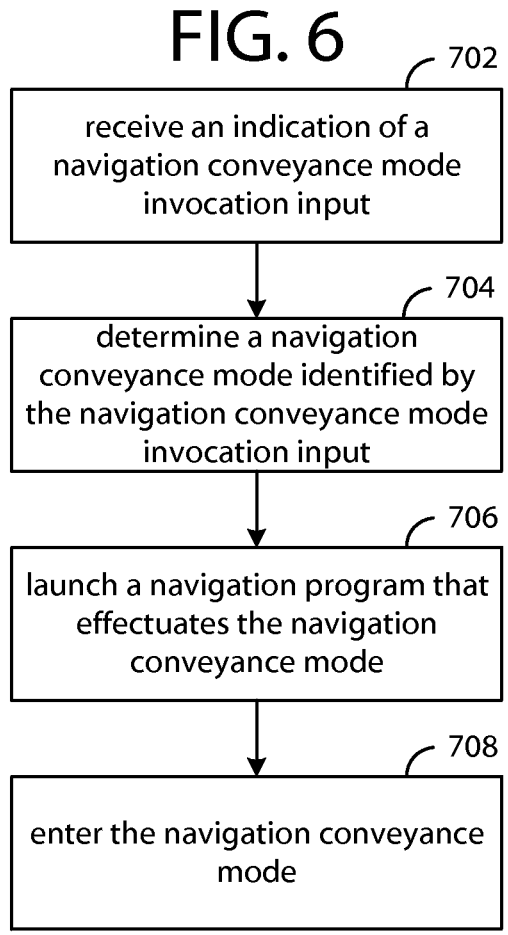
FIG. 7 is a flow diagram illustrating activities associated with a navigation conveyance mode according to at least one example embodiment.

FIG. 7 is a flow diagram illustrating activities associated with a navigation conveyance mode according to at least one example embodiment. In at least one example embodiment, there is a set of operations that corresponds the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus receives an indication of a navigation conveyance mode invocation input, similarly as described regarding block 602 of FIG. 6. At block 704, the apparatus determines a navigation conveyance mode identified by the navigation conveyance mode invocation input, similarly as described regarding block 604 of FIG. 6.

At block 706, the apparatus launches a navigation program that effectuates the navigation conveyance mode. The launching and the navigation program are similar as described regarding FIGS. 2A-2D.

At block 708, the apparatus enters the navigation conveyance mode, similarly as described regarding block 606 of FIG. 6.

Figure 8:
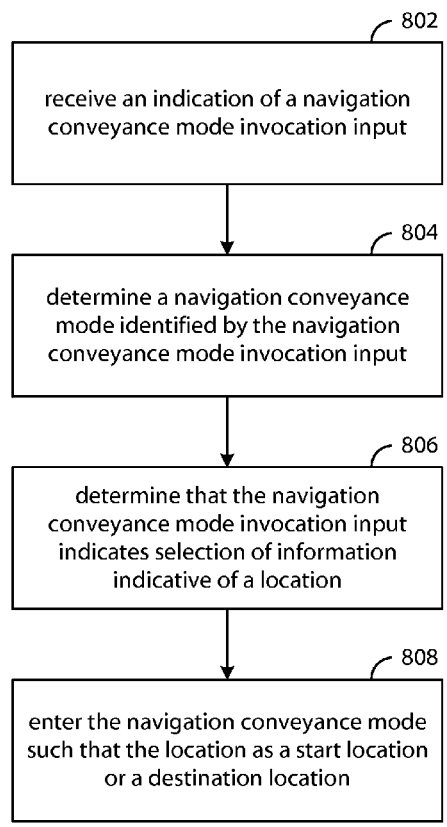
FIG. 8 is a flow diagram illustrating activities associated with a navigation conveyance mode according to at least one example embodiment.

FIG. 8 is a flow diagram illustrating activities associated with a navigation conveyance mode according to at least one example embodiment. In at least one example embodiment, there is a set of operations that corresponds the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus receives an indication of a navigation conveyance mode invocation input, similarly as described regarding block 602 of FIG. 6. At block 804, the apparatus determines a navigation conveyance mode identified by the navigation conveyance mode invocation input, similarly as described regarding block 604 of FIG. 6.

At block 806, the apparatus determines that the navigation conveyance mode invocation input indicates selection of information indicative of a location. The determination, and the selection may be similar as described regarding FIGS. 2A-2D, FIGS. 3A-3C, FIGS. 4A-4C, FIGS. 5A-5D, and/or the like.

At block 808, the apparatus enters the navigation conveyance mode such that the navigation conveyance mode relates to the location as at least one of a start location or a destination location. The entry, the start location and the destination location may be similar as described regarding FIGS. 2A-2D, FIGS. 3A-3C, and/or the like.

Figure 9:
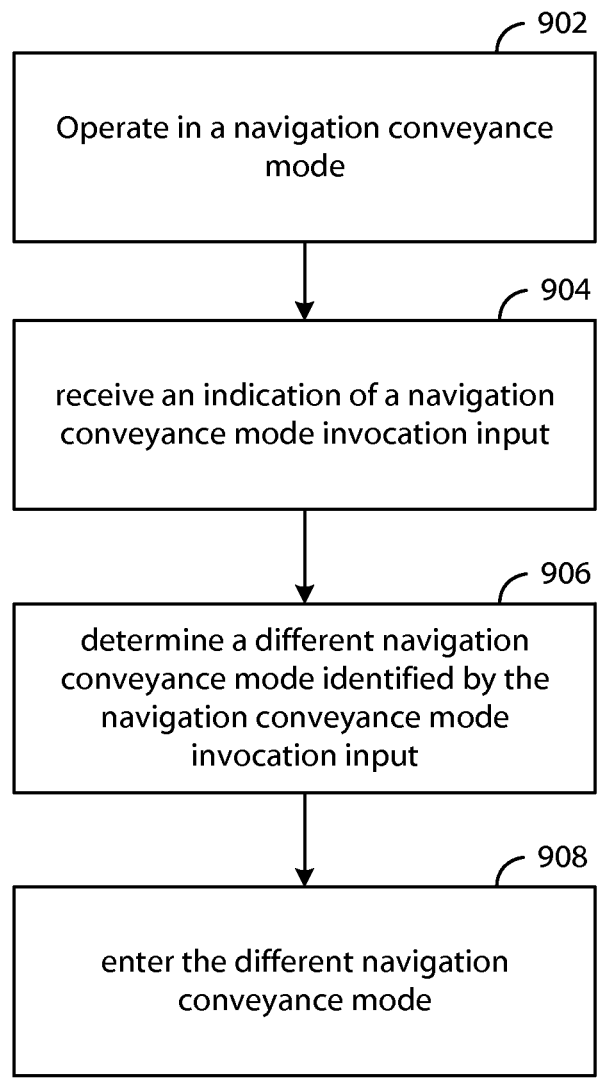
FIG. 9 is a flow diagram illustrating activities associated with a navigation conveyance mode according to at least one example embodiment.

FIG. 9 is a flow diagram illustrating activities associated with a navigation conveyance mode according to at least one example embodiment. In at least one example embodiment, there is a set of operations that corresponds the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

In some circumstances, it may be desirable for the user to be able to transition from a navigation conveyance mode to a different navigation conveyance mode. In such circumstances, it may be desirable for the user to invoke the transition by way of a navigation conveyance invocation input. For example, the user may have inadvertently entered an automobile navigation conveyance mode and may desire to transition from the automobile navigation conveyance mode to a pedestrian navigation conveyance mode. In such circumstances, it may be desirable for the user to enter the pedestrian navigation conveyance mode from the automobile navigation conveyance mode by performing the navigation conveyance invocation input. For example, while operating in the automobile conveyance mode of the example of FIG. 2C, the apparatus may transition to the navigation conveyance mode of the example of FIG. 2D.

In at least one example embodiment, while operating in a navigation conveyance mode, an apparatus receives an indication of a navigation conveyance mode invocation input that is indicative of a different navigation conveyance mode. In such an example, the apparatus may transition from the navigation conveyance mode to the different navigation conveyance mode. In at least one example embodiment, transition from the navigation conveyance mode to the different navigation conveyance mode comprises termination of the navigation conveyance mode. For example, the apparatus may terminate the navigation conveyance mode and enter the different navigation conveyance mode.

In at least one example embodiment, the apparatus determines a destination location of the navigation conveyance mode to correlate to a destination location of the different navigation conveyance mode. For example, when the apparatus transitions from a navigation conveyance mode to a different navigation conveyance mode, the apparatus may retain the destination location and/or the start location from the navigation conveyance mode to be utilized in the different navigation conveyance mode.

At block 902, the apparatus operates in a navigation conveyance mode. The operation and the navigation conveyance mode may be similar as described regarding FIGS. 2A-2D. At block 904, the apparatus receives an indication of a navigation conveyance mode invocation input, similarly as described regarding block 602 of FIG. 6.

At block 906, the apparatus determines a different navigation conveyance mode identified by the navigation conveyance mode invocation input. The determination and the different navigation conveyance mode may be similar as described regarding FIGS. 2A-2D, FIGS. 3A-3C, FIGS. 4A-4C, FIGS. 5A-5D, and/or the like.

At block 908, the apparatus enters the different navigation conveyance mode. The entry of the different navigation conveyance mode may be similar as described regarding FIGS. 2A-2D, FIGS. 3A-3C, and/or the like. In this manner, entry of the different navigation conveyance mode may be based, at least in part, on the determination of the different navigation conveyance mode. For example, entry of the different navigation conveyance mode may be caused, at least in part, by the different determination of the navigation conveyance mode.

Figure 10:
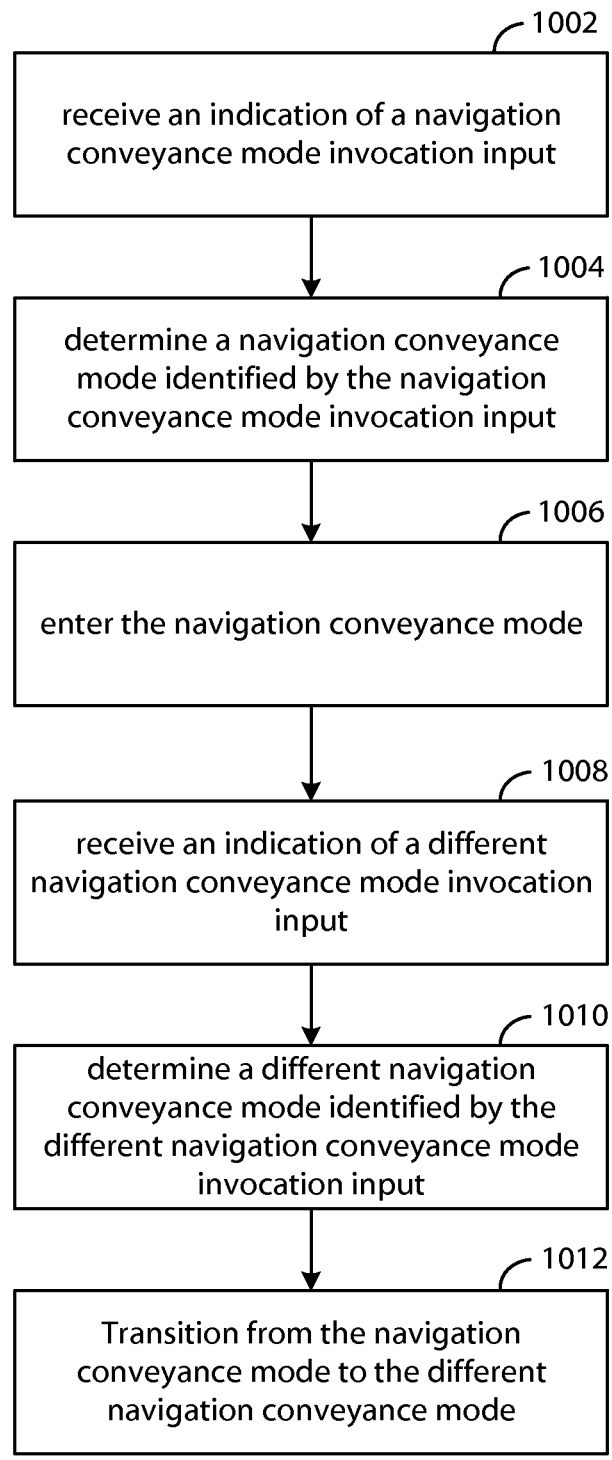
FIG. 10 is a flow diagram illustrating activities associated with a navigation conveyance mode according to at least one example embodiment.

FIG. 10 is a flow diagram illustrating activities associated with a navigation conveyance mode according to at least one example embodiment. In at least one example embodiment, there is a set of operations that corresponds the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus receives an indication of a navigation conveyance mode invocation input, similarly as described regarding block 602 of FIG. 6. At block 1004, the apparatus determines a navigation conveyance mode identified by the navigation conveyance mode invocation input, similarly as described regarding block 604 of FIG. 6. At block 1006, the apparatus enters the navigation conveyance mode, similarly as described regarding block 606 of FIG. 6.

At block 1008, the apparatus receives an indication of a different navigation conveyance mode invocation input. The receipt, the indication, and the different navigation mode invocation input may be similar as described regarding FIGS. 2A-2D, FIGS. 3A-3C, FIGS. 4A-4C, FIGS. 5A-5D, and/or the like.

At block 1010, the apparatus determines a different navigation conveyance mode identified by the different navigation conveyance mode invocation input. The determination and the different navigation conveyance mode may be similar as described regarding FIGS. 2A-2D, FIGS. 3A-3C, FIGS. 4A-4C, FIGS. 5A-5D, and/or the like.

At block 1012, the apparatus transitions from the navigation conveyance mode to the different navigation conveyance mode. The transition may be similar as described regarding FIG. 9.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 804 of FIG. 8 may be performed after block 806. Furthermore, if desired, one or more of the above-described functions may be optional or may be combined. For example, block 706 of FIG. 7 may be optional and/or combined with block 606 of FIG. 6.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
at least one processor;
at least one memory including computer program code, the memory and the computer program code configured to, working with the processor, cause the apparatus to perform at least the following:
receiving an indication of a navigation conveyance mode invocation input;
determining a navigation conveyance mode, from a set of navigation conveyance modes, based, at least in part, on the navigation conveyance mode being identified by the navigation conveyance mode invocation input, the set of navigation conveyance modes comprising at least two of: an automobile navigation conveyance mode, a pedestrian navigation conveyance mode, or a bicycle navigation conveyance mode; and
determining a route based, at least in part, on the navigation conveyance mode and map information,
wherein the navigation conveyance mode invocation input is a gesture input that is indicative of the navigation conveyance mode and the gesture input comprises at least one of: a two finger motion input and at least two touch inputs indicative of the gesture.

2. The apparatus of claim 1, wherein entrance to the navigation conveyance mode comprises launching a navigation program that effectuates the navigation conveyance mode.

3. The apparatus of claim 1, wherein the memory further includes computer program code, the memory and the computer program code configured to, working with the processor, cause the apparatus to determine that the navigation conveyance mode invocation input indicates selection of information indicative of a location.

4. The apparatus of claim 3, wherein the navigation conveyance mode identifies the location as at least one of a start location or a destination location.

5. The apparatus of claim 1, wherein the memory further includes computer program code, the memory and the computer program code configured to, working with the processor, cause the apparatus to operate in a different navigation conveyance mode, wherein the indication of the navigation conveyance mode invocation input is received during operation of the different navigation conveyance mode.

6. The apparatus of claim 1, wherein the navigation conveyance mode is a pedestrian navigation conveyance mode, and the navigation conveyance mode invocation input is a finger walking gesture.

7. The apparatus of claim 1, wherein the navigation conveyance mode is an automobile navigation conveyance mode, and the navigation conveyance mode invocation input is a finger steering gesture.

8. The apparatus of claim 1, wherein the apparatus comprises a display.

9. A method comprising:
receiving an indication of a navigation conveyance mode invocation input;
determining a navigation conveyance mode, from a set of navigation conveyance modes, based, at least in part, on the navigation conveyance mode being identified by the navigation conveyance mode invocation input, the set of navigation conveyance modes comprising at least two of: an automobile navigation conveyance mode, a pedestrian navigation conveyance mode, or a bicycle navigation conveyance mode; and
determining a route based, at least in part, on the navigation conveyance mode and map information,
wherein the navigation conveyance mode invocation input is a gesture input that is indicative of the navigation conveyance mode and the gesture input comprises at least one of: a two finger motion input and at least two touch inputs indicative of the gesture.

10. The method of claim 9, wherein entrance to the navigation conveyance mode comprises launching a navigation program that effectuates the navigation conveyance mode.

11. The method of claim 9, further comprising determining that the navigation conveyance mode invocation input indicates selection of information indicative of a location.

12. The method of claim 11, wherein the navigation conveyance mode identifies the location as at least one of a start location or a destination location.

13. The method of claim 9, further comprising operating in a different navigation conveyance mode, wherein the indication of the navigation conveyance mode invocation input is received during operation of the different navigation conveyance mode.

14. The method of claim 9, wherein the navigation conveyance mode is a pedestrian navigation conveyance mode, and the navigation conveyance mode invocation input is a finger walking gesture.

15. At least one non-transitory computer-readable medium encoded with instructions that, when executed by a processor, perform:
- receiving an indication of a navigation conveyance mode invocation input;
- determining a navigation conveyance mode, from a set of navigation conveyance modes, based, at least in part, on the navigation conveyance mode being identified by the navigation conveyance mode invocation input, the set of navigation conveyance modes comprising at least two of: an automobile navigation conveyance mode, a pedestrian navigation conveyance mode, or a bicycle navigation conveyance mode; and
- determining a route based, at least in part, on the navigation conveyance mode and map information,
- wherein the navigation conveyance mode invocation input is a gesture input that is indicative of the navigation conveyance mode and wherein the gesture input comprises at least one of: a two finger motion input and at least two touch inputs indicative of the gesture.

16. The medium of claim 15, wherein entrance to the navigation conveyance mode comprises launching a navigation program that effectuates the navigation conveyance mode.

17. The medium of claim 15, wherein the medium is further encoded with instructions that, when executed by the processor, performs determining that the navigation conveyance mode invocation input indicates selection of information indicative of a location.

18. The medium of claim 17, wherein the navigation conveyance mode identifies the location as at least one of a start location or a destination location.

* * * * *